US009030049B2

(12) United States Patent
Lai

(10) Patent No.: US 9,030,049 B2
(45) Date of Patent: May 12, 2015

(54) ALTERNATING CURRENT (AC) TO DIRECT CURRENT (DC) CONVERTER DEVICE

(75) Inventor: Ching-Ming Lai, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 540 days.

(21) Appl. No.: 13/495,082

(22) Filed: Jun. 13, 2012

(65) Prior Publication Data

US 2013/0127248 A1    May 23, 2013

(30) Foreign Application Priority Data

Nov. 23, 2011    (CN) .......................... 2011 1 0391860

(51) Int. Cl.
*H02J 9/00* (2006.01)
*H02J 1/00* (2006.01)
*H02M 1/00* (2006.01)

(52) U.S. Cl.
CPC ................ *H02J 9/005* (2013.01); *Y02B 70/16* (2013.01); *H02M 2001/0032* (2013.01)

(58) Field of Classification Search
USPC ........................................................... 307/80
See application file for complete search history.

(56) References Cited

U.S. PATENT DOCUMENTS 8,924,757 B2 * 12/2014 Itou ................................ 713/323
2009/0296435 A1 * 12/2009 Lee et al. ......................... 363/74

* cited by examiner

Primary Examiner — Robert L. Deberadinis
(74) Attorney, Agent, or Firm — Rosenberg, Klein & Lee

(57) ABSTRACT

An alternating current (AC) to direct current (DC) converter device includes an AC-to-DC converter circuit, a step-down DC converter circuit, a controller, a first standby power converter circuit and a second standby power converter circuit. The AC-to-DC converter circuit is adapted to receive and perform an AC-to-DC conversion on an AC power so as to output a DC bus voltage. The step-down DC converter performs a step-down conversion on the DC bus voltage so as to output a main power voltage. The first standby power converter circuit performs a step-down conversion on the main power voltage so as to output a first standby DC voltage. The second standby power converter circuit performs a step-down conversion on the DC bus voltage to output a second standby DC voltage.

5 Claims, 4 Drawing Sheets

ALTERNATING CURRENT (AC) TO DIRECT CURRENT (DC) CONVERTER DEVICE

CROSS-REFERENCE TO RELATED APPLICATION

This application claims priority to Chinese Patent Application No. 201110391860.9, filed on Nov. 23, 2011.

BACKGROUND OF THE INVENTION

1. Field of the Invention

The invention relates to a power converter device, more particularly, an AC-to-DC converter device.

2. Description of the Related Art

With the electronic devices, such as home appliances, having intelligent features gaining great popularity, the use of standby power becomes an important topic. Standby power is the power needed when an electronic device is on standby (or, in idle) such as for maintaining a designated mode of operation, decreasing start up time, or waiting for a remote command. Standby power is different from main power needed for normal operation of the electronic device. The voltage level of standby power is usually substantially less than that of main power and needs to be generated separately.

FIGS. 1 and 2 show a conventional design of an offline AC-to-DC power converter 1 usually seen in electronic devices. The offline AC-to-DC power converter 1 includes an AC-to-DC power converter circuit 11, a step-down DC converter circuit 12, a standby power converter circuit 13 and a pulse-width modulation (PWM) signal generator 14. The AC-to-DC power converter circuit 11 converts an AC input voltage (90-264 $V_{ac}$) into a DC bus voltage ($V_{BUS}$) (380V). The step-down DC converter circuit 12 then performs a step-down conversion on the DC bus voltage ($V_{BUS}$) so as to output a main voltage ($V_{DC}$). The standby power converter circuit 13 performs a step-down conversion on the DC bus voltage ($V_{BUS}$) so as to output a standby voltage (Vsb). The PWM signal generator 14 generates two PWM signals opposite in phase to respectively perform switching on a first switch (SW1) and a second switch (SW2) of the step-down DC converter circuit 12. When the electronic device operates in a normal mode, the step-down DC converter circuit 12 provides the main voltage ($V_{DC}$) for operation. When the electronic device operates in a standby mode, the standby power converter circuit 13 provides the standby voltage (Vsb) for operation.

However, when the main voltage ($V_{DC}$) and the standby voltage (Vsb) are both needed in the normal mode, the following happens. The standby power converter circuit 13 is an isolation type flyback converter circuit that receives the DC bus voltage ($V_{BUS}$) and outputs the standby voltage (Vsb) and thus operates under high input/output potential difference. The load (hence the resistance) is substantially larger in the normal mode than in the standby mode. Where a large output is required under a large load, the presence of leakage inductance and distributed capacitance (from stray or parasitic components) will increase voltage and current surges, causing conversion loss, which becomes more evident as the load increases, and decreasing the stability of power provision.

SUMMARY OF THE INVENTION

Therefore, an object of the present invention is to provide an AC-to-DC power converter device that has substantially increased stability in power provision and improved standby power conversion efficiency.

An alternating current (AC) to direct current (DC) converter device of the present invention includes an AC-to-DC converter circuit, a step-down DC converter circuit, a controller, a first standby power converter circuit and a second standby power converter circuit.

The AC-to-DC converter circuit is adapted to receive and perform an AC-to-DC conversion on an AC power so as to output a DC bus voltage. The step-down DC converter circuit is electrically coupled to the AC-to-DC converter circuit to receive the DC bus voltage therefrom, and performs a step-down conversion on the DC bus voltage so as to output a main power voltage. The first standby power converter circuit is electrically coupled to the step-down DC converter circuit to receive the main power voltage therefrom, and includes a first switch electrically coupled to the controller. The first standby converter circuit performs a step-down conversion on the main power voltage so as to output a first standby DC voltage when the controller performs a pulse-width modulation control on the first switch. The second standby power converter circuit is electrically coupled to the AC-to-DC converter circuit to receive the DC bus voltage therefrom, and includes a second switch that is electrically coupled to the controller. The second standby power converter circuit performs a step-down conversion on the DC bus voltage to output a second standby DC voltage when the controller performs a pulse-width modulation control on the second switch.

Preferably, the controller controls the second switch to operate in a non-conducting state and performs pulse-width modulation control on the first switch when the step-down DC converter circuit operates, and controls the first switch to operate in a non-conducting state and performs pulse-width modulation control on the second switch when the step-down DC converter circuit stops operating.

Preferably, the step-down DC converter circuit and the first standby power converter circuit operate when the AC-to-DC converter device operates in a normal mode, and the second standby power converter circuit operates when the AC-to-DC converter device operates in a standby mode.

Preferably, the first standby power converter circuit is a buck DC-to-DC converter circuit that includes the first switch, an inductor, a diode, a capacitor and a load resistor connected in parallel to the capacitor. A first terminal of the inductor is electrically coupled to a first terminal of the first switch. A second terminal of the inductor is electrically coupled to a first junction of the capacitor and the load resistor. A second terminal of the first switch is electrically coupled to the step-down DC power converter circuit for receiving the main power voltage therefrom. A cathode of the diode is electrically coupled to the first terminal of the first switch. An anode of the diode is electrically coupled to a second junction of the capacitor and the load resistor. The second standby power converter circuit is a flyback DC-to-DC converter circuit that includes the second switch, a transformer, the diode, the capacitor and the load resistor. A first terminal of a primary winding of the transformer is electrically coupled to the AC-to-DC converter circuit for receiving the DC bus voltage therefrom. A second terminal of the primary winding is electrically coupled to a first terminal of the second switch. A second terminal of the second switch is grounded. A secondary winding of the transformer serves as the inductor of the first standby power converter circuit.

Preferably, the first switch is a low-voltage MOSFET switch. The second switch is a high-voltage MOSFET switch.

Preferably, the step-down DC converter circuit is a half-bridge logical link control (LLC) resonant type power converter circuit including a third switch and a fourth switch that are series connected. The AC-to-DC converter device further comprises a PWM signal generator electrically coupled to the third and fourth switches, and generates two PWM signals opposite in phase for respectively controlling operation of the third and fourth switches.

One of the effects of the present invention resides in that the first standby power converter and the second standby power converter are integrated together so as to share common circuit elements, such as the first standby power converter using the secondary winding of the transformer of the second standby power converter as the inductor for the filter circuit instead of providing an independent inductor to thereby reduce cost. When operating in the normal mode, the first standby power provided by the first standby power converter is used, and when operating in standby mode, the second standby power outputted by the second standby power converter is used to increase standby power conversion efficiency and enhance reliability of power provision.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

The AC-to-DC converter device of the present invention can be applied in external adapters, desktop power supplies, server power supplies or various electronic devices that use standby power.

Figure 3:
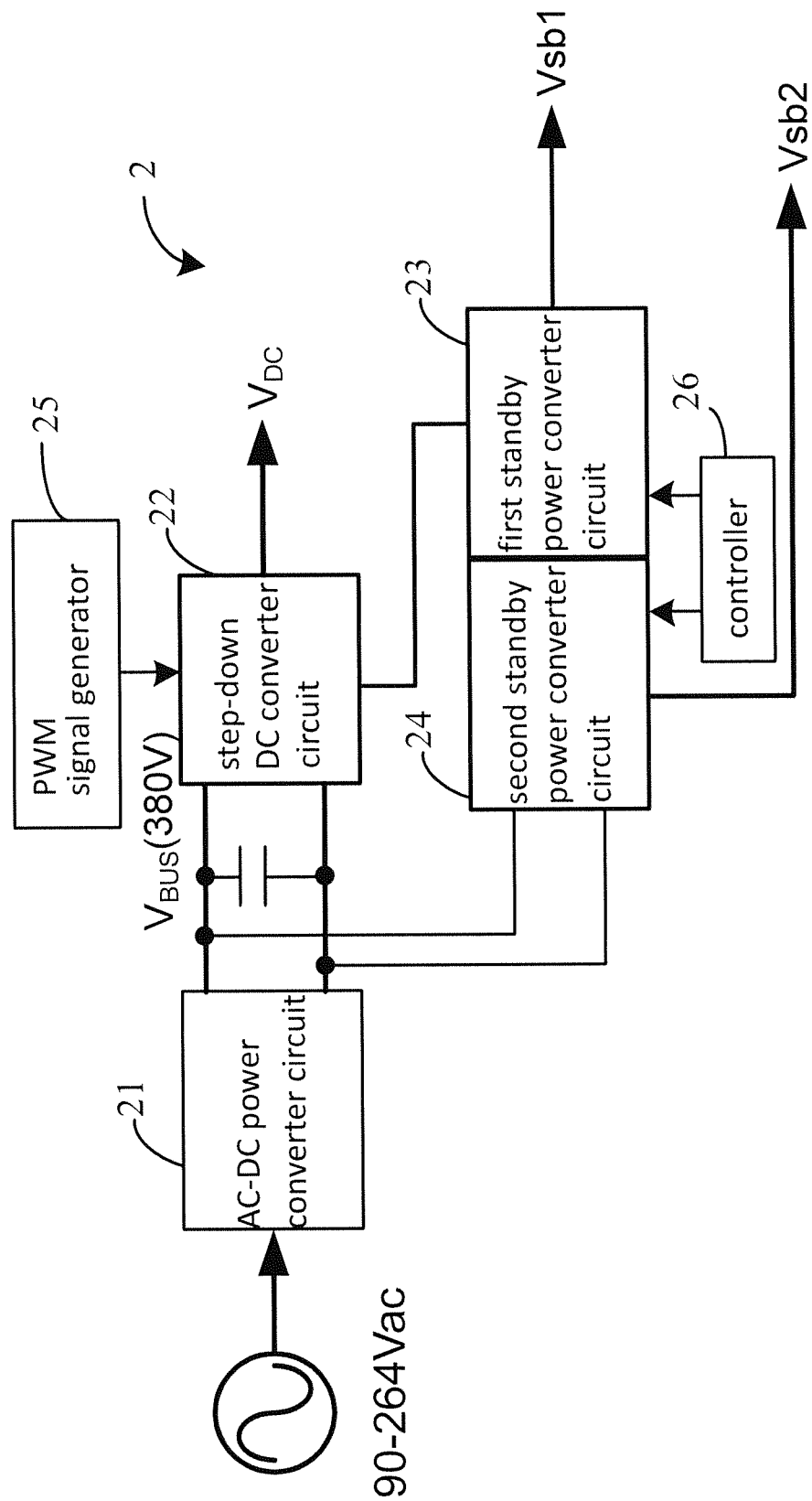
FIG. 3 is a block diagram of a preferred embodiment of the AC-to-DC converter device of the present invention.
Figure 4:
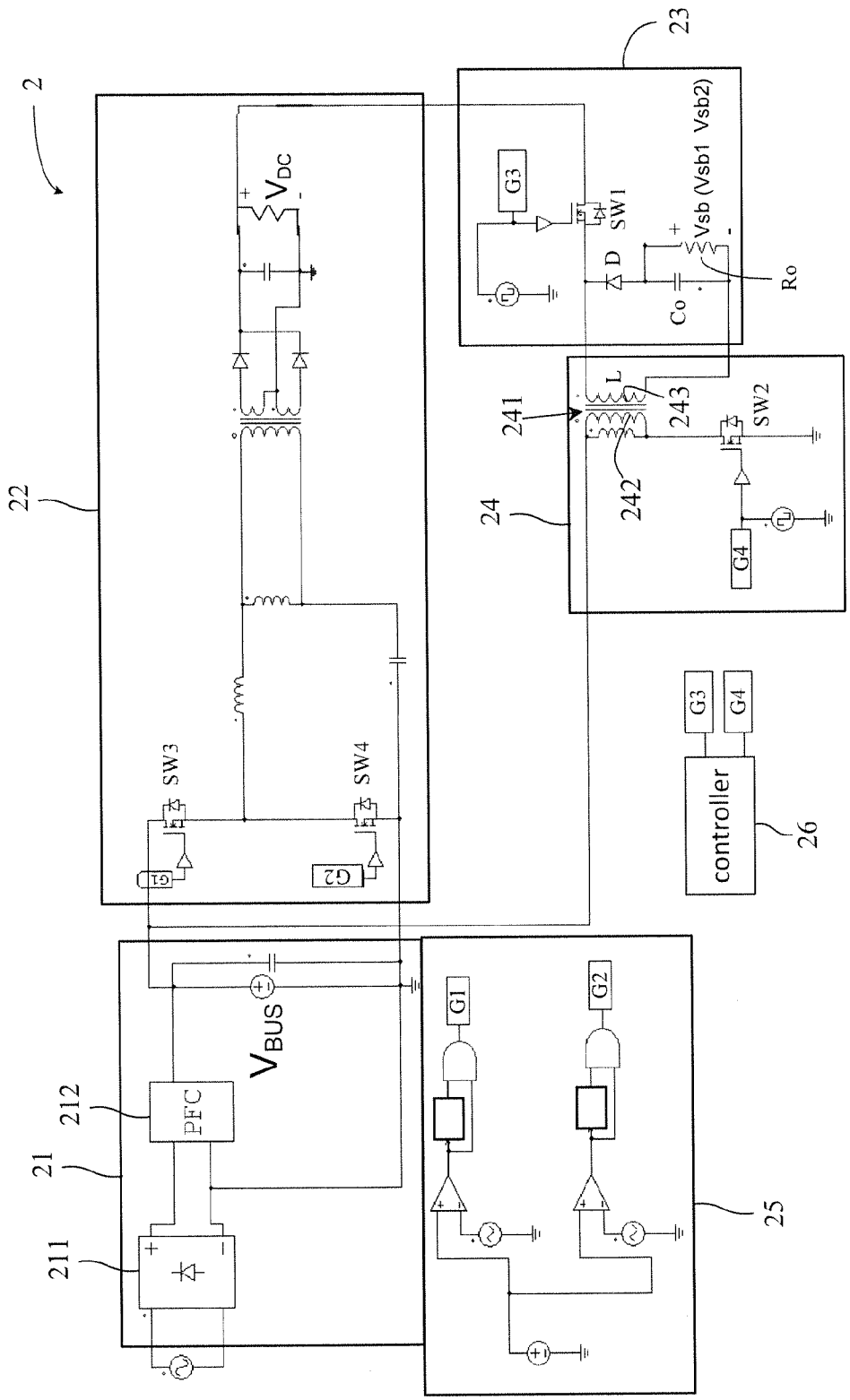
FIG. 4 is a circuit diagram of the preferred embodiment.

FIGS. 3 and 4 show a preferred embodiment of an AC-to-DC converter device 2 of the present invention that includes an AC-to-DC converter circuit 21, a step-down DC converter circuit 22, a controller 26, a first standby power converter circuit 23, a second standby power converter circuit 24 and a pulse-width modulation (PWM) signal generator 25.

The AC-to-DC converter circuit 21 receives and performs an AC-to-DC conversion on an AC power (90-264 Vac) so as to output a DC bus voltage ($V_{BUS}$) (e.g. 380V). The AC-to-DC converter circuit 21 includes an all wave rectifier 211 and a power factor corrector 212. The all wave rectifier 211 (e.g., bridge rectifier) performs an all wave rectification operation on the received AC power and outputs the rectified AC power to the power factor corrector 212. The power factor corrector 212 is made of inductor(s), diode(s) and transistor(s) (not shown), and performs power factor correction and voltage stabilization operations on the rectified AC power so as to output the DC bus voltage ($V_{BUS}$).

The step-down DC converter circuit 22 is electrically coupled to the AC-to-DC converter circuit 21 to receive the DC bus voltage ($V_{BUS}$) therefrom. In the embodiment, the step-down DC converter circuit 22 is an isolated type resonant converter, such as the conventional half-bridge logical link control (LLC) resonant converter. To respond to the need of the end terminal load, the step-down DC converter circuit 22 performs a step-down conversion on the DC bus voltage ($V_{BUS}$) so as to output a main power voltage ($V_{DC}$) (usually 12V or 19V). The main power voltage ($V_{DC}$) is usually the power needed for the end terminal load to operate in a normal mode.

The first standby power converter circuit 23 is electrically coupled to the step-down DC converter circuit 22 to receive the main power voltage ($V_{DC}$) therefrom. The first standby power converter circuit 23 includes a first switch (SW1) electrically coupled to the controller 26. The first standby converter circuit 23 performs a step-down conversion on the main power voltage ($V_{DC}$) so as to output a first standby DC voltage (Vsb1) (generally 5V or 12V) when the controller 26 performs a pulse-width modulation (PWM) control on the first switch (SW1). The first standby power converter circuit 23 is a buck DC-to-DC converter circuit that, apart from the first switch (SW1), includes an inductor (L), a diode (D), a capacitor (Co), and a load resistor (Ro) connected in parallel to the capacitor (Co). A first terminal of the inductor (L) is electrically coupled to a first terminal of the first switch (SW1). A second terminal of the inductor (L) is electrically coupled to a first junction of the capacitor (Co) and the load resistor (Ro). A second terminal of the first switch (SW1) is electrically coupled to the step-down DC power converter circuit 22 for receiving the main power voltage ($V_{DC}$) therefrom. A cathode of the diode (D) (free-wheeling diode) is electrically coupled to the first terminal of the first switch (SW1). An anode of the diode (D) is electrically coupled to a second junction of the capacitor (Co) and the load resistor (Ro). The first switch (SW1) is a low voltage MOSFET switch. By performing PWM control on the first switch (SW1) for the same to switch at a high frequency based on the pulse width, the main power voltage ($V_{DC}$) is modulated by the diode (D) to become a high frequency pulse DC with a main power voltage ($V_{DC}$) state and a zero voltage state, which, after being filtered by a low-pass filter constituted by the inductor (L) and the capacitor (Co), generates the first standby DC voltage (Vsb1) that is substantially lower than the main power voltage ($V_{DC}$).

Since the conversion from the main power voltage ($V_{DC}$) into the first standby DC voltage (Vsb1) as performed by the first standby power converter circuit 23 is a low potential difference conversion, the conversion efficiency is high and is suitable for the normal mode where a high load resistance requires a correspondingly higher power output. Therefore, the first standby DC voltage (Vsb1) is the standby power mainly used in the normal mode.

The second standby power converter circuit 24 is electrically coupled to the AC-to-DC converter circuit 21 to receive the DC bus voltage ($V_{BUS}$) (380V) therefrom. The second standby power converter circuit 24 includes a second switch (SW2) that is electrically coupled to the controller 26. The second standby power converter circuit 24 performs a step-down conversion on the DC bus voltage ($V_{BUS}$) to output a second standby DC voltage (Vsb2) (usually 5V or 12V) when the controller 26 performs a PWM control on the second switch (SW2). The second standby power converter circuit 24 is an isolation type buck-boost converter such as the conventional flyback DC-to-DC converter circuit. The second standby power converter circuit 24, apart from the second switch (SW2), includes a transformer 241, and shares in common the diode (D), the capacitor (Co) and the load resistor (Ro) with the first standby power converter circuit 23. A first terminal of a primary winding 242 of the transformer 241 is electrically coupled to the AC-to-DC converter circuit 21 for receiving the DC bus voltage ($V_{BUS}$) therefrom. A second terminal of the primary winding 242 is electrically coupled to a first terminal of the second switch (SW2). A second terminal of the second switch (SW2) is grounded. The second switch (SW2) is a high voltage MOSFET switch. A secondary winding 243 of the transformer 241 serves as the inductor (L) for the first standby power converter circuit 23, thereby saving cost by not needing an extra inductor. By performing PWM control on the second switch (SW2), the second switch (SW2) switches at a high frequency based on the pulse width to allow the transformer 241 to perform a step-down conversion on the DC bus voltage ($V_{BUS}$) followed by filtering through the low-pass filter constituted by the inductor (L) and the capacitor (Co), the second standby voltage (Vsb2) that is substantially lower than the main power voltage ($V_{DC}$) is generated.

If the second standby power converter circuit 24 operates when the AC-to-DC converter circuit 2 is in the normal mode where the load is high (high current output), the power conversion would be a high potential difference operation, where the leakage inductance and distributed capacitance within the transformer 241 thereof will increase voltage and current surges affects affect the conversion efficiency. For this reason, the second standby voltage (Vsb2) is mainly used in the standby mode where the load is low, requiring a low current output and where the main power voltage ($V_{DC}$) output is not needed.

The step-down DC converter circuit 22 further includes a third switch (SW3) and a fourth switch (SW4). The PWM signal generator 25 is electrically coupled to the third switch (SW3) and the fourth switch (SW4), and generates two PWM signals opposite in phase for respectively controlling alternating conduction of the third and fourth switches (SW3), (SW4) to perform step-down conversion control.

Since the first and second standby power converter circuits 23, 24 shares some common circuit elements, only one can operate at a particular time such that the first standby power converter circuit 23 and the second standby power converter circuit 24 respectively operate in the normal mode and the standby mode. Therefore, the controller 26 controls whether the first and second standby power converter circuits 23, 24 are operating or not. When the AC-to-DC converter device 2 operates in the normal mode that requires an output of both the main power voltage ($V_{DC}$) and the first standby DC voltage (Vsb1) to the load, the controller 26 controls the second switch (SW2) to operate in a non-conducting state and outputs a PWM signal to perform PWM control on the first switch (SW1) such that the first standby power converter circuit 23 can output the first standby DC voltage (Vsb1). When the AC-to-DC converter device 2 operates in the standby mode that requires an output of the second standby DC voltage (Vsb2) to the load, the controller 26 controls the first switch (SW1) to operate in a non-conducting state and outputs another PWM signal to perform PWM control on the second switch (SW2) such that the second standby power converter circuit 24 can output the second standby DC voltage (Vsb2). As such, by having different standby power converter circuits generating different standby DC voltages to correspond to different operating modes, the conversion efficiency for generating standby power is substantially increased.

Figure 1:
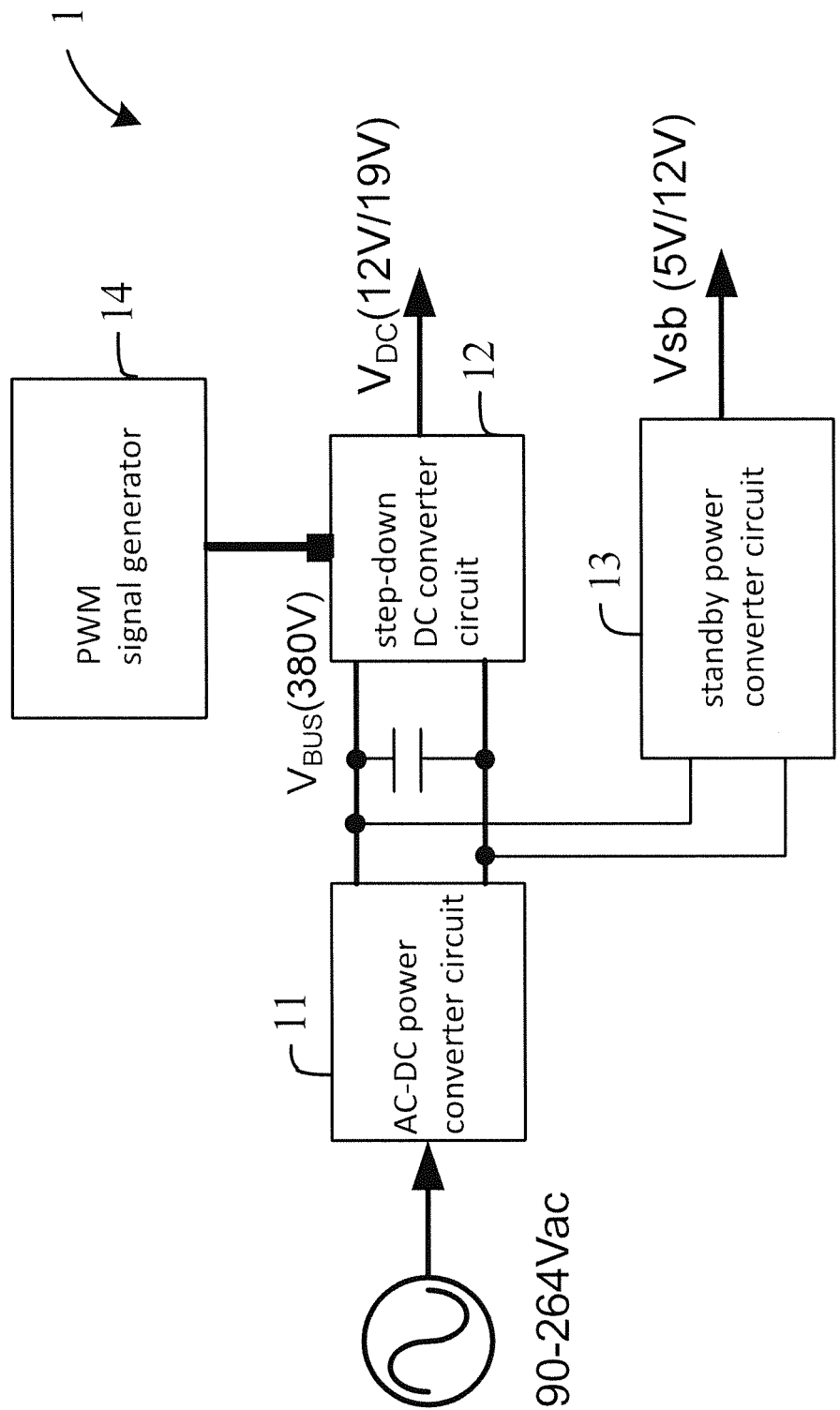
FIG. 1 is a block diagram of a conventional AC-to-DC power converter.
Figure 2:
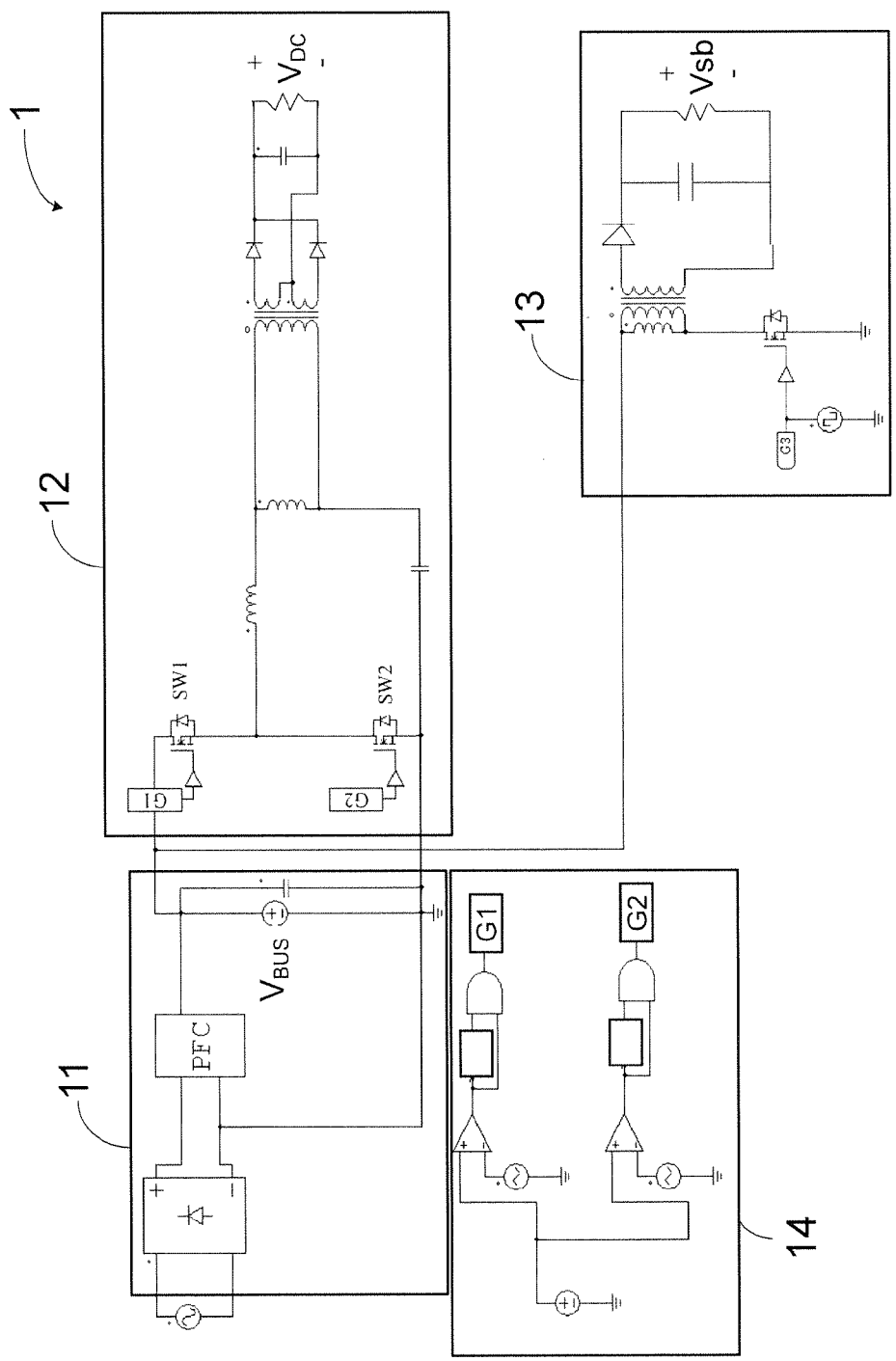
FIG. 2 is a circuit diagram of the conventional AC-to-DC power converter.

From the above, the embodiment of the present invention integrates two standby power converter circuits 23, 24 together such they share common circuit elements, in which the first standby power converter circuit 23 uses the secondary winding 243 of the transformer 241 of the second standby power converter circuit 24 as the inductor (L) for the low-pass filter circuit thereof without additionally providing an independent inductor, thereby saving manufacturing cost. Moreover, under the normal mode, the first standby power converter circuit 23 with substantially high conversion efficiency and substantially high output current is used to provide the first standby DC voltage (Vsb1) to improve upon the problem of inefficient conversion under the normal mode as can be seen in the conventional standby power converter circuit 13 (shown in FIGS. 1 and 2), and under the standby mode where the main power voltage ($V_{DC}$) is not needed (no main power voltage ($V_{DC}$) output), the second standby power converter circuit 24 is used to generate the second standby DC voltage (Vsb2) to further increase the overall efficiency and reliability of power provision.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An alternating current (AC) to direct current (DC) converter device, comprising:
   an AC-to-DC converter circuit adapted to receive and perform an AC-to-DC conversion on an AC power so as to output a DC bus voltage;
   a step-down DC converter circuit coupled electrically to said AC-to-DC converter circuit to receive the DC bus voltage therefrom, and performing a step-down conversion on the DC bus voltage so as to output a main power voltage;
   a controller;
   a first standby power converter circuit coupled electrically to said step-down DC converter circuit to receive the main power voltage therefrom, and including a first switch that is coupled electrically to said controller, said first standby converter circuit performing a step-down conversion on the main power voltage so as to output a first standby DC voltage when said controller performs a pulse-width modulation (PWM) control on said first switch; and
   a second standby power converter circuit coupled electrically to said AC-to-DC converter circuit to receive the DC bus voltage therefrom, and including a second switch that is coupled electrically to said controller, said second standby power converter circuit performing a step-down conversion on the DC bus voltage to output a second standby DC voltage when said controller performs a PWM control on said second switch;
   wherein said controller controls said second switch to operate in a non-conducting state and performs PWM control on said first switch when said step-down DC converter circuit operates, and controls said first switch to operate in a non-conducting state and performs PWM control on said second switch when said step-down DC converter circuit stops operating.

2. The AC-to-DC converter device as claimed in claim 1, wherein said step-down DC converter circuit and said first standby power converter circuit operate when said AC-to-DC converter device operates in a normal mode, and said second standby power converter circuit operates when said AC-to-DC converter device operates in a standby mode.

3. The AC-to-DC converter device as claimed in claim 1, wherein said first standby power converter circuit is a buck DC-to-DC converter circuit that includes said first switch, an inductor, a diode, a capacitor, and a load resistor connected in parallel to said capacitor, a first terminal of said inductor being electrically coupled to a first terminal of said first switch, a second terminal of said inductor being electrically coupled to a first junction of said capacitor and said load resistor, a second terminal of said first switch being electrically coupled to said step-down DC power converter circuit for receiving the main power voltage therefrom, a cathode of said diode being electrically coupled to said first terminal of said first switch, an anode of said diode being electrically coupled to a second junction of said capacitor and said load resistor; and wherein said second standby power converter circuit is a flyback DC-to-DC converter circuit that includes said second switch, a transformer, said diode, said capacitor and said load resistor, a first terminal of a primary winding of said transformer being coupled electrically to said AC-to-DC converter circuit for receiving the DC bus voltage therefrom, a second terminal of said primary winding being electrically coupled to a first terminal of said second switch, a second terminal of said second switch is grounded, a secondary winding of said transformer serving as said inductor.

4. The AC-to-DC converter device as claimed in claim 1, wherein said first switch is a low-voltage MOSFET switch, and said second switch is a high-voltage MOSFET switch.

5. The AC-to-DC converter device as claimed in claim 4, wherein said step-down DC converter circuit is a half-bridge logical link control (LLC) resonant converter circuit including a third switch and a fourth switch that are series connected, and the AC-to-DC converter device further comprises a PWM signal generator coupled electrically to said third and fourth switches, and generating two PWM signals opposite in phase for respectively controlling operation of said third and fourth switches.

* * * * *